US009588941B2

(12) United States Patent
Carrier et al.

(10) Patent No.: US 9,588,941 B2
(45) Date of Patent: Mar. 7, 2017

(54) CONTEXT-BASED VISUALIZATION GENERATION

(71) Applicant: International Business Machines Corporation, Armonk, NY (US)

(72) Inventors: Scott R. Carrier, Apex, NC (US); Scott N. Gerard, Wake Forest, NC (US); Sterling R. Smith, Apex, NC (US); David B. Styles, Cary, NC (US); Eric Woods, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 13/788,227

(22) Filed: Mar. 7, 2013

(65) Prior Publication Data

US 2014/0258817 A1 Sep. 11, 2014

(51) Int. Cl.
G06F 17/21 (2006.01)

(52) U.S. Cl.
CPC .................. G06F 17/211 (2013.01)

(58) Field of Classification Search
CPC ........... G06F 17/30017; G06F 17/2235; G06F 17/241; G06F 17/211; G06F 17/278; G06F 17/30277; G06F 3/0483; G06F 3/0237; G11B 27/034
USPC ........................................................ 715/202
See application file for complete search history.

(56) References Cited

U.S. PATENT DOCUMENTS

| 5,469,538 | A | 11/1995 | Razdow |
| 7,631,013 | B2 * | 12/2009 | Parsons et al. |
| 7,631,254 | B2 | 12/2009 | Layard et al. |
| 8,352,876 | B2 * | 1/2013 | Batarseh et al. ............. 715/776 |
| 2003/0172052 | A1 | 9/2003 | Crandell et al. |
| 2004/0090439 | A1 | 5/2004 | Dillner |
| 2008/0082907 | A1 * | 4/2008 | Sorotokin et al. ............ 715/210 |
| 2010/0332967 | A1 * | 12/2010 | Kraft ................ G06F 17/30905 715/234 |
| 2011/0128288 | A1 * | 6/2011 | Petrou ............... G06F 17/30047 345/428 |
| 2013/0073998 | A1 * | 3/2013 | Migos et al. ................. 715/776 |
| 2013/0129310 | A1 * | 5/2013 | Shustorovich et al. ...... 386/230 |
| 2013/0139053 | A1 * | 5/2013 | Le Chevalier et al. ...... 715/255 |
| 2014/0101606 | A1 * | 4/2014 | Albrecht ............... G06F 3/0481 715/803 |
| 2014/0359107 | A1 * | 12/2014 | Kim .................. G06F 17/30899 709/223 |

OTHER PUBLICATIONS

Gale et al, "A Method for Disambiguating Word Senses in a Large Corpus", published: 1993, publisher: Kluwer Academeic Publishers, pp. 1-25.*

(Continued)

*Primary Examiner* — Wilson Tsui
(74) *Attorney, Agent, or Firm* — DeLizio Law, PLLC

(57) ABSTRACT

Visualizable subject matter contained within data is detected. A context in which the visualizable subject matter appears is determined. A visualization engine of a plurality of visualization engines is selected based, at least in part, on the context in which the visualizable subject matter appears. The visualization engine is configured to generate a visualization of the visualizable subject matter.

18 Claims, 6 Drawing Sheets

(56) References Cited

OTHER PUBLICATIONS

Michal Yerushalmy, "Functions of Interactive Visual Representations in Interactive Mathematical Textbooks," Department of Education, University of Haifa, Jan. 2005, 36 pages.
C. Schmid et al., "A Web-Based System for Control Engineering Education," American Control Conference 2000, Jun. 28-30, 2000, 5 pages.
Samuel S. Dooley, "Coordinating Mathematical Content and Presentation Markup in Interactive Mathematical Documents," ISSAC'98, ACM, 1998, pp. 54-61.
Petr Sojka, "Digitisation Workflow in the Czech Digital Mathematics Library," ASCM Organized Session—Digitizing Mathematics, 2009, pp. 272-280.
Petr Sojka et al., "From Bitmaps Back to Brains: DML-CZ and EuDML Projects—Document Engineering for Digital Libraries," University of Birmingham AI and CS Seminar, UK, Nov. 8, 2010, 66 pages.

* cited by examiner

CONTEXT-BASED VISUALIZATION GENERATION

BACKGROUND

Embodiments of the inventive subject matter generally relate to the field of computing systems and, more particularly, to context-based visualization generation.

Combining the use of visualizations with textual, verbal or other forms of communications can increase the value of the communications. Pictures, animations and interactive visualizations are not only more interesting to many people than other, non-visual forms of communication, but they can help provide greater understanding of the information contained in the underlying communications.

SUMMARY

Embodiments of the inventive subject matter generally include a method detecting a visualizable subject matter contained within data. A context in which the visualizable subject matter appears is determined. A visualization engine, from a plurality of visualization engines, is selected based, at least in part, on the context in which the visualizable subject matter appears. The visualization engine is configured to generate a visualization of the visualizable subject matter.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
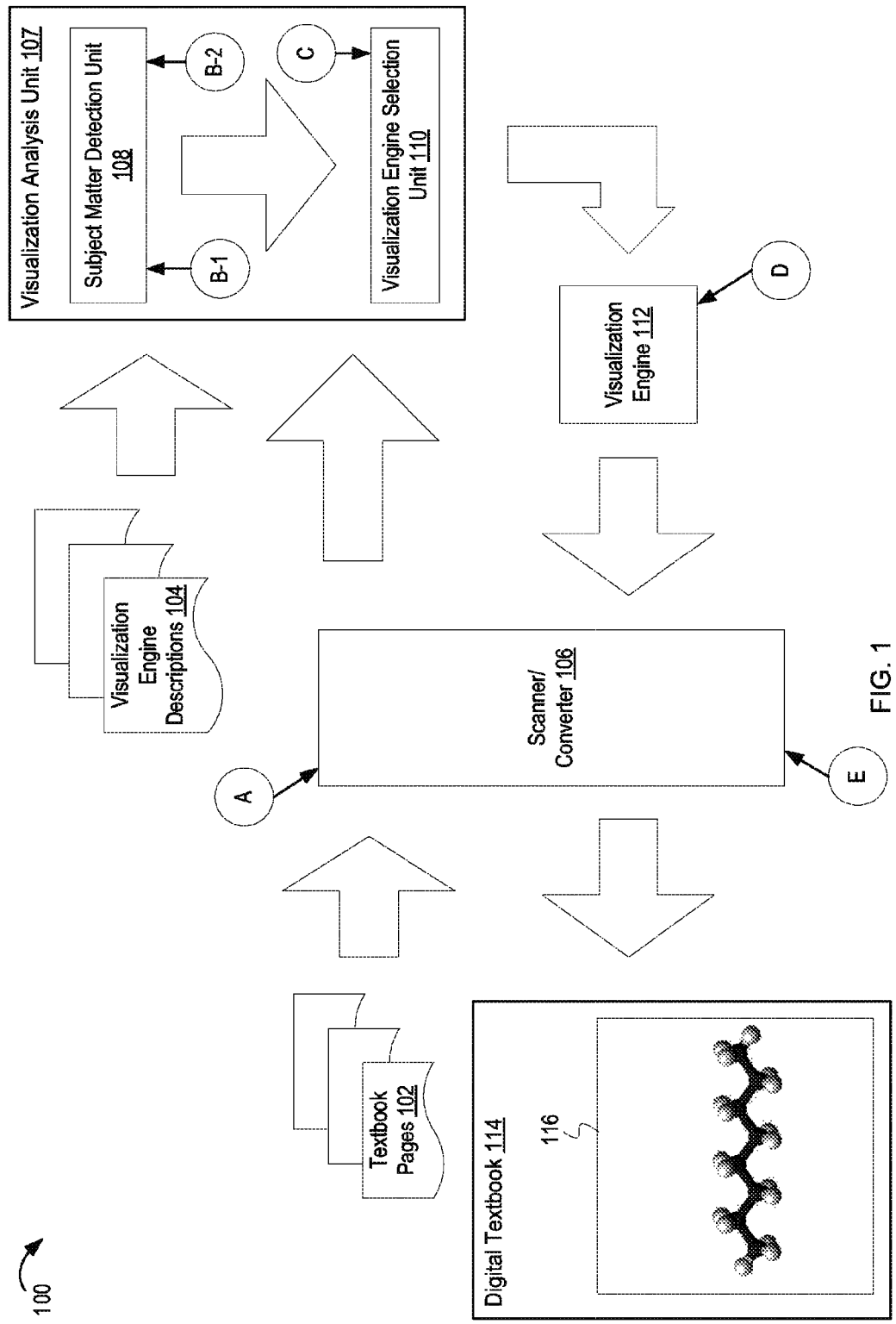
FIG. 1 depicts the components and operations of a visualizing textbook digitization system that detects subject matter within the textbook, determines an appropriate visualization engine for the subject matter and generates an appropriate visualization of the subject matter.

The description that follows includes example systems, methods, techniques, instruction sequences and computer program products that embody techniques of the present inventive subject matter. However, it is understood that the described embodiments may be practiced without these specific details. For instance, although examples refer to textbooks, any form of communication, such as speech or other types of written communications can be used. In other instances, well-known instruction instances, protocols, structures and techniques have not been shown in detail in order not to obfuscate the description.

"Visualizable subject matter" is any subject matter that can be represented or described in a non-textual manner. For example, subject matter that can be displayed as two-dimensional and three-dimensional graphs, models, simulations, pictures, etc. can be visualizable subject matter. Examples of such subject matter include mathematical equations, chemical compounds, chemical elements, audio clips, physical objects and people.

The ability for a computing system to recognize visualizable subject matter can be used to enrich the underlying communications. Furthermore, the amount of work involved in creating the communications can be reduced by allowing the computing system to recognize and generate the visualizations. For example, instead of preparing specific materials for a lecture, a professor might allow a computer system to display visualizations of what the professor is speaking about. Thus, not only does the professor not have to spend time creating material for the lecture, but the lecture can go in a direction the participants want it to, and the professor will have the proper material to facilitate the discussion.

Another example centers on textbooks and other learning materials. Increasing use of technology in education, particularly the rise in popularity of tablet computers, has led to a demand for improved learning materials. Digitized textbooks cost less than actual printed textbooks while allowing useful new features, such as interactive images and animations. However, many existing textbooks are not obsolete, thus making the creation of a completely new, digitized version unnecessary. Furthermore, a developer or author still reads through the textbook and determines when visualizations are appropriate, determines if an appropriate visualization is available, and creates it.

The conversion of a textbook from a printed version to a digitized version can be done in many ways. At the most basic, the textbook can simply be scanned into a common document format, such as Adobe System's® Portable Document Format (PDF). Once in a digital format, most computing systems can display the scanned pages as the pages of a digital book. Although the simplest, and perhaps lowest cost technique, the resulting digitized version does not harness the full power available to digital books. At the most advanced, the textbook can be digitized by one or more people, with one or more people inputting the text and one or more people digitizing the images and graphics. This technique can be much costlier than merely scanning the textbook, but can allow the full power of digital books to be harnessed. For example, an illustration depicting a mathematical equation can allow the reader to modify the mathematical equation and display the result of the modifications. Or, instead of a two dimensional image of a building, a three dimensional model can be used, allowing a user to view the building from all sides, and perhaps take a three dimensional tour of the building.

In various embodiments, software for digitizing textbooks recognizes visualizable subject matter described in natural language. The software can determine appropriate visualization engines for the subject matter, generate visualizations for the subject matter and insert the visualizations into the digitized textbook. For example, the software can recognize the name of a chemical in a chemistry textbook and insert a three dimensional model near the text, allowing a reader to view the atomic makeup of the chemical. As another example, the software can recognize the text "the line crosses the y-axis at 3 and has a slope of ⅔" as describing a line defined by the equation y=mx+b, where 'b' equals three and 'm' equals two-thirds. The software can then provide the appropriate equation derived from the text to a graph visualization engine, and insert the resulting graph into the text. The resulting graph can also include the ability to change the constant values 'b' and 'm' to different values and update the graph accordingly, allowing the reader to better understand how changes to input parameters impact the resulting graph.

FIG. 1 depicts the components and operations of a visualizing textbook digitization system that detects subject matter within the textbook, determines an appropriate visualization engine for the subject matter and generates an appropriate visualization of the subject matter. FIG. 1 includes a visualizing textbook digitization system 100, including a set of textbook pages 102 and a set of visualization engine descriptions 104. The visualizing textbook digitization system 100 also includes a scanner/convertor 106 and a visualization analysis unit 107. The visualization analysis unit 107 includes a subject matter detection unit (hereinafter "detection unit") 108 and a visualization engine selection unit (hereinafter "selection unit") 110 for selecting a visualization engine 112.

At stage A, a set of textbook pages 102 are input into a scanner/converter 106, which produces a version of the textbook in a format for input to the analysis unit 107. The scanner/converter 106 can comprise hardware and/or software designed to take a textbook and convert it into a digital textbook. A textbook can initially be in printed form or digital form. If the textbook is in printed form, the textbook pages 102 are separated and input into a scanner/converter 106. The textbook pages 102 are scanned into a digital format, such as a digital image file or digital document format. The scanner/converter 106 then converts the digital textbook pages 102 into a format that is compatible with the analysis unit 107. The specific format can vary based on the specific analysis unit 107 implementation. For example, the analysis unit 107 may analyze just textual information, and thus the scanner/converter 106 creates a plaintext file representing the textbook pages 102 after performing optical character recognition or similar functionality. The analysis unit 107 may also analyze formatting and graphical information, thus the file resulting from the scanner/converter 106 operation can include supplemental formatting information and embedded images.

If the textbook is already in digital form, the textbook pages 102 may already be in a similar format to that of a printed textbook after scanning Textbooks can be designed and typeset digitally, thus the final version of the textbook may already exist in a digital format. Additionally, some textbooks may already be scanned, as might be the case if a digital version of the textbook is distributed with the printed textbook version. By eliminating the need to separate the textbook pages 102, the digital textbook can be input into the converter, bypassing the scanner portion of the scanner/converter 106. The conversion can vary from that of the scanned textbook depending on the input format. However, the resulting output is compatible with the analysis unit 107, as above.

At stage B-1, the digitized textbook pages 102 are analyzed for subject matter by the analysis unit 107. Subject matter can be the topic of an entire book or a subject or object of a single sentence. For example, consider the sentence "A house is a type of building." Both "house" and "building" are visualizable subject matter. Additionally, a subject matter can be contained in a longer description. As described above, the analysis unit 107 can be implemented to determine that the language "the line crosses the y-axis at 3 and has a slope of ⅔" describes a linear equation, even though the term "linear equation" does not explicitly appear in the description.

When the analysis unit 107 receives the digitized textbook pages 102, the analysis unit 107 processes them using the detection unit 108. The detection unit 108 searches for subject matter by processing the text and analyzing the language used. For example, the analysis can begin by looking at a particular paragraph of text. The detection unit 108 can break down the paragraph into the constituent sentences. The detection unit 108 can then further break each sentence down into its constituent parts, such as the subject, verb and modifiers. The detection unit 108 can then compare the parts of each sentence of the paragraph. The detection unit 108 might determine that because each sentence has a variation of the same subject matter, the main topic of the paragraph is that particular subject matter.

The detection unit 108 can employ various techniques during the analysis. For example, after determining the constituent parts of a sentence, the detection unit 108 can look up synonyms of each of the parts of the sentence. The detection unit 108 can then utilize the synonyms to determine whether sentences that use different words are actually referring to the same or similar subject matter. The detection unit 108 can also transform words into their base words by removing common endings, such as pluralizing endings (such as -s, -es, -ies, etc.). By paring down words to their base words, the detection unit 108 can better compare words that do not have the exact same spelling, but still refer to the same subject matter.

The detection unit 108 can also be implemented to recognize structured or non-natural language elements. For example, the detection unit 108 might recognize the text "ax+b=c" as being an equation. The detection unit 108 can determine the preceding text is an equation because mathematical symbols are not generally used as part of natural language. The detection unit 108 can be implemented such that it recognizes the structure of the equation as well. For example, the detection unit 108 can include a mathematical expression parser that will break the equation down into its constituent parts, constants a, b and c, and variable x.

The detection unit 108 can also be implemented to recognize relationships within the text. For example, assume that the detection unit 108 had discovered the above equation and utilized a mathematical expression parser to determine the constituent parts as described above. When analyzing the text following the equation, the detection unit 108 may find a phrase stating "the value of a is 5." The detection unit 108 can determine that, in this context, "a" is not an article, but rather a grammatical object. The detection unit 108 can then determine that the phrase "a is 5" establishes an equality relationship between "a" and "5." Because the phrase appears a short distance from the equation, which has a constant labeled "a," the detection unit 108 can then determine that the phrase "the value of a is 5" is stating that, in this context, the value "5" is to be substituted for the constant a in the equation.

The prior example demonstrates how the detection unit 108 can utilize context to recognize the meaning of natural language. In other words, the detection unit 108 was able to determine that "a" in the phrase "the value of a is 5" is not an article because it was followed by a verb. However, context can be used even further. Consider a section of text that contains the word "aluminum." Aluminum is a subject matter. However, the word "aluminum" does not provide much information on what specifically is being referred to. For example, "aluminum" could be referring to the aggregate form of aluminum, such as a sheet of aluminum foil. Or, it could be referring to the element aluminum. Properly determining the manner in which the term "aluminum" is being used determines whether or not the proper visualization is used. The actual context in which the word "aluminum" may be used can help determine which usage is proper. For example, the word "aluminum" can appear in a phrase such as "the element aluminum." The detection unit 108 can determine that the reference is to the element of aluminum, not a sheet of aluminum metal, based on the context provided by the word "element." Thus, the detection unit 108 can determine that the context in which the subject matter of "aluminum" appears is that of chemistry, or more specifically, chemical elements.

As described above, the detection unit 108 can be implemented to analyze information beyond the actual text contained within the textbook pages 102. For example, the formatting associated with the text can provide additional contextual information about the related text. Many textbooks are laid out in a hierarchical manner. The title of an algebra textbook might be "Introduction to Algebra," a chapter might be titled "Quadratic Equations," and a section within the chapter might be titled "The Quadratic Formula." Each heading is likely to be formatted differently, with the greatest emphasis given to the title and the least emphasis given to the section heading. The detection unit 108 can utilize the context provided by the formatting to determine that the text in the section titled "The Quadratic Formula" is related to the quadratic formula, which is related to quadratic equations, which is a subset of algebra.

$$x = \frac{-b \pm \sqrt{b^2 - 4ac}}{2a}$$

Example 1

Example 1 depicts the quadratic formula. Once the detection unit 108 determines that the text of a particular section is about the quadratic formula, it can increase the confidence with which it correlates natural language descriptions of the formula with the related values. For example, the detection unit 108 might find a set of phrases in the section stating "the coefficient a is 5, the coefficient b is 3 and the coefficient c is 7." Because the detection unit 108 has determined that the subject matter of the section is the quadratic formula, the detection unit 108 can determine that the coefficients described in the phrases are related to the values a, b, and c found in the quadratic formula.

The detection unit 108 can also analyze data from other sources external to the textbook itself. For example, there may be additional metadata associated with the textbook that is not included within the textbook pages 102. The additional metadata can include other information related to the textbook, such as a synopsis, reviews, etc. The metadata can also include the configuration of the analysis unit 107 and its components as well as user supplied metadata. For example, the analysis unit 107 can provide an interface that allows a user to select from a set of subject matter categories (such as mathematics) and/or allow a user to type in a description of the textbook. Additionally, the detection unit 108 can be implemented to connect to external data sources and search for information related to the textbook, as described below.

At stage B-2, the visualization engine descriptions 104 are input into the analysis unit 107, which the processes the visualization engine descriptions using the detection unit 108. A visualization engine 112 is a component that accepts a description, formula or other representation of a subject matter and creates a visualization of that subject matter. For example, a chemistry-related visualization engine may take the name of an element as an input and produce a three dimensional model of an atom of the element. The same chemistry-related visualization engine may take the name of a chemical as an input and produce a three dimensional model of the molecular structure of the chemical. A graph visualization engine may take an algebraic equation as an input and generate a graph of the algebraic equation.

Each visualization engine description is associated with a particular visualization engine. The visualization engine descriptions 104 can describe the subject matter, inputs, outputs and options related to the visualization engines. The visualization engine descriptions 104 do not have to be written specifically for use with the detection unit 108, but can be any information that the detection unit 108 can utilize to determine what visualizable subject matter are usable by the particular visualization engine. For example, the visualization engine descriptions 104 could include application programming interface (API) documentation, sales brochures or manual/help information.

The detection unit 108 can perform the same analysis on the visualization engine descriptions 104 as used to analyze the textbook pages 102. The input format of the visualization engine descriptions 104 can vary similarly to that of the input format for the textbook pages 102. While the same analysis can be applied by the detection unit 108 to the visualization engine descriptions 104 as applied to the textbook pages 102, the analysis can vary as well. For example, the visualization engine descriptions 104 can include data that has a higher level of structure and less natural language than the textbook pages 102. Thus, the analysis implementation may vary to provide better results from input data that differs from that of the textbook pages 102.

A visualization engine description of a chemistry visualization engine might describe the visualization engine as "generating three-dimensional models of chemical elements." Or, the documentation of an API for the chemistry visualization engine might describe an input variable for a function as "the name of the chemical element to generate the model of." In both cases, the detection unit 108 may determine that the phrase "chemical element" is a visualizable subject matter, and that the chemistry visualization engine is related to the field of chemistry.

The visualization engine descriptions 104 may be static. Thus, the visualization engine descriptions 104 can be analyzed once, and the results of the analysis stored for future use. As new visualization engines are added, the description associated with the new visualization engines can be analyzed by the detection unit 108 and stored with the previously analyzed visualization engine descriptions 104. This can lead to more efficient analysis because the visualization engine descriptions 104 are not analyzed each time a set of textbook pages are analyzed. If the visualization engine descriptions 104 or the analysis performed by the detection unit 108 are modified, the visualization engine descriptions 104 can be reanalyzed as needed.

At stage C, the output from the detection unit 108 is input into the selection unit 110. The selection unit 110 uses the analysis results from the detection unit 108 to select the proper visualization engine for the subject matter found at stage B-1. As described above, the detection unit 108 can determine various details about a subject matter. For instance, in the aluminum example described above, the detection unit 108 can determine that the subject matter of "aluminum" refers to elemental aluminum, not a sheet of metal, etc. Thus, by utilizing the analysis results, the selection unit 110 can narrow down the appropriate visualization engines to those related to chemistry. The selection unit 110 can further narrow down the appropriate visualization engine to those determined to be directed to visualizing chemical elements.

Additionally, the selection unit 110 transforms the subject matter determined at stage B-1 into a form appropriate for the selected visualization engine 112. For example, a quadratic equation can be written as shown in Example 2, below. An API implemented for a graphing visualization engine can define a function for graphing quadratic equations that accepts three parameters, each representing one of the constants a, b, and c. However, the detection unit 108 may have detected a quadratic equation of the form shown in Example 3. In this case, the selection unit 110 transforms the quadratic equation into a form compatible with Example 2.

$$ax^2+bx+c=0$$

Example 2

$$y=a(x-h)^2+k$$

Example 3

In some instances, there may be no appropriate visualization engine 112 for the subject matter, even though the subject matter is visualizable. In other instances, the subject matter detected is not visualizable. In some implementations, the detection unit 108 detects all subject matter, allowing the selection unit 110 to determine whether they are visualizable. The selection unit 110 can be implemented such that any subject matter for which a visualization engine is not found is considered to be non-visualizable. Additionally, the detection unit 108 can employ operations in its analysis to determine whether a subject matter is in fact visualizable, thus only passing visualizable subject matter to the selection unit 110.

At stage D, the visualization engine 112 selected at stage C is configured to display the subject matter and provided to the scanner/converter 106. The selected visualization engine 112 is configured by providing the inputs and settings that produce the appropriate visualization. The visualization engine 112 is then provided to the scanner/converter 106 for insertion into the digital textbook. The analysis results from the detection unit 108 can include an indication of the location of the particular subject matter, such as the location of the words that defined the subject matter. These indications can be provided to the scanner/converter 106, thus allowing the scanner/converter 106 to insert the visualization in the proper location.

The interface between the selection unit 110 and the visualization engine 112 is determined by both the implementation of the selection unit 110 and the visualization engine 112. For example, a set of visualization engines may implement a particular API that is standard across all of the set of visualization engines. The selection unit 110 can be implemented to interface directly with the standardized API. Additional visualization engines may not implement a standardized API, and thus additional software components can be incorporated into the selection unit 110 that implement the techniques used to interface with particular visualization engines.

As an example, a chemistry visualization engine API may include two functions, one for chemical elements and one for molecular compounds. The selection unit 110 can determine that the chemistry visualization engine is appropriate for generating a visualization for the mineral sodium chloride. The selection unit 110 can also determine that the API function for molecular compounds is the appropriate function because sodium chloride is not a chemical element. The selection unit 110 then provides the term "sodium chloride" as a parameter to the appropriate function of the chemistry visualization engine. The selection unit 110 can also cause the visualization engine 112 to generate the visualization, or the generation of the visualization can be handled by the scanner/converter 106 or the actual digital textbook 114.

A graphing visualization engine, such as one that might be used for a linear equation, may have an API including a function called "linearEq." The selection unit 110 can determine that the "linearEq" function of the graphing visualization engine is the appropriate function for a linear equation. The "linearEq" function may take, as input, values for m and b as they apply to a linear equation of the form "y=mx+b". The detection unit 108 can determine that a particular textbook page refers to a linear equation with constants of two and ten for m and b, respectively. Thus, the selection unit 110 calls the "linearEq" function with the parameters two and ten.

The visualization engine 112 can take a variety of forms. For example, the visualization engine 112 may be responsible for displaying static images. A reference to "Mount Vernon," for example, can be visualized with a picture depicting the former house of George Washington, located in Virginia. The visualization engine 112 can be implemented to generate static graphs or models, as described above. The visualization engine 112 can be implemented to generate interactive graphs or models as well. For example, a graph of a linear equation can include user interface elements, such as sliders, to allow a user to change the values for m and b. An interactive model can be three dimensional, with the ability to rotate and zoom in on the model. The visualization engine 112 can also be implemented to generate animations, which can also be interactive. For example, an animation can be generated to display an animation depicting a physics subject matter, such as a projectile problem.

Further, the visualization engine 112 can be implemented in another component. For example, a scanner/converter 106 can be implemented to output the digital textbook 114 as a PDF document. Functionality to embed images into PDF documents is frequently used, thus the scanner/converter 106 can implement such functionality. The selection unit 110 can pass a reference, such as an indication of where an image exists on a storage media or server, to the scanner/converter 106. The scanner/converter 106 functionality then acts as the visualization engine 112 by displaying and/or converting the image for display in the resulting digital textbook 114. Thus, a visualization engine 112 is not limited to being an independent component of the system, but can be implemented in combination with another component. In other words, the visualization engine 112 merely embodies functionality to allow a particular visual representation to be generated, whether a low-level image processing library or a full suite of software designed for complex mathematics.

It should be noted that although these examples discuss selecting a single visualization engine 112, it can be the case that a particular subject matter is visualizable using multiple visualization engines. For example, a chemical that can be visualized with an interactive three dimensional model can generally be visualized with a two dimensional image. When multiple visualization engines are available, the selection unit 110 can be implemented to select the visualization engine 112 that is determined to be the most appropriate. The selection unit 110 can be implemented to determine the appropriateness of a visualization engine based on a variety of factors, such as configuration settings and relevance rankings. For example, the selection unit 110 can be configured to select a visualization engine that produces a three dimensional visualization if both three dimensional visualizations and two dimensional visualizations are available. The selection unit 110 can determine a relevance ranking when comparing the analysis results of the textbook with the analysis results of the visualization engines. For example, the selection unit 110 may determine that a first visualization engine that includes the term "linear equations" in the first visualization engine description is more relevant than a second visualization engine that only uses the term "equation." The selection unit 110 can also be implemented to provide all appropriate visualization engines to the scanner/converter 106.

In implementations where multiple visualization engines can be provided to the scanner/converter 106, the scanner/converter 106 can provide an interface allowing a user to select from the available visualization engines. The user can be a person assisting in the digitization of the textbook or an end user. In the case that the user is assisting in the digitization of the textbook, the user can select one of the multiple visualization engines, which is then used to generate or select a visualization that is inserted into the final digital textbook 114.

At stage E, the scanner/converter 106 inserts the visualization into the digital textbook 114. The techniques used to insert the visualization can vary based on the visualization engine 112 and the underlying digital textbook 114 format. The digital textbook 114 format can be implemented in a variety of ways that allows for the embedding of a broad range of visualizations. For example, the digital textbook 114 format can be implemented to allow the embedding of static images directly into the digital textbook 114 using a standardized binary image format. The digital textbook 114 format can also be implemented to include plugin functionality, allowing plugins to be selected or implemented that can display visualizations of specific formats.

The scanner/converter 106 can also be implemented to support a variety of ways of displaying the visualization. For example, some visualizations can be embedded directly on the page, similar to an image in a non-digital textbook. Some visualizations can be hidden initially. The digital textbook 114 can display a button indicating that there is an associated visualization, or the text that defines the visualized subject matter can be "clickable," resulting in the visualization being displayed when the user clicks on the text itself. The scanner/converter 106 can be implemented to dynamically select the appropriate technique for displaying the visualization. For example, some portions of text may have little visualizable subject matter, thus allowing for the visualizations to be displayed by default. Some portions of text may have much visualizable subject matter, in which case the scanner/converter 106 can hide the visualizations by default or hide some visualizations and display other visualizations by default. After embedding the visualization 116, the digital textbook 114 is output to an appropriate format.

The techniques described above to implement the analysis unit 107 are not exclusive. A variety of additional techniques can be employed to allow the analysis unit 107 to discover visualizable subject matter and match the subject matter with appropriate visualization engines. For example, computing techniques such as machine learning and statistical analysis can be implemented. Additionally, the techniques described above are optional, and the analysis unit 107 can be implemented without some or all of them. The implementation of the analysis unit 107 may vary, as well as the techniques used to implement the analysis unit 107 depending on factors such as desired performance and the type of input data.

Although described above as detecting subject matter in text, the analysis unit 107 can also be implemented to detect subject matter in graphical data as well. For example, the textbook pages 102 can be input into the analysis unit 107 in a format that includes both textual and graphical data, such as images. A mathematics textbook might include a graph of a linear equation. The analysis unit 107 can use image analysis tools and techniques to determine that the image was a graph, determining the labels on the graph axes, etc. The analysis unit 107 can also be implemented to derive the equation from the graph by using such techniques as regression analysis. By implementing image analysis, the analysis unit 107 increases the available data and context from which to detect subject matter. For example, the analysis unit 107 can be implemented to correlate data present in a graph or table with descriptions of the data in the associated text. Additionally, the analysis unit 107 can use the detected subject matter to create a new visualization to replace the original image. New visualizations generated by a visualization engine can take advantage of features included in the visualization engine. For example, a graph can be converted into an interactive graph, or a depiction of a chemical compound can be converted into a three dimensional model.

Figure 2:
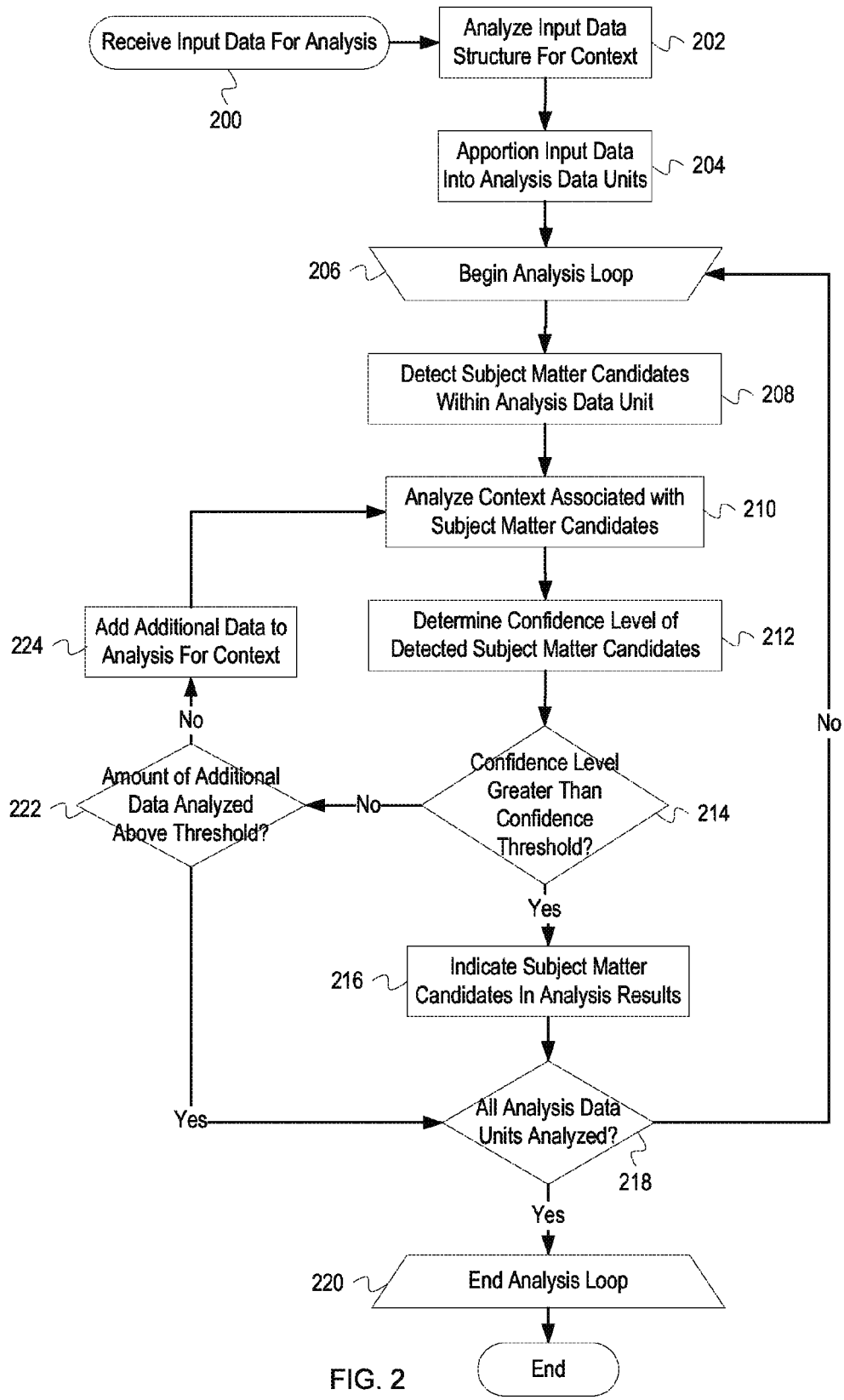
FIG. 2 depicts a flowchart of example operations for detecting subject matter in input data.

FIG. 2 depicts a flowchart of example operations for detecting subject matter in input data.

At block 200, a subject matter detection unit (hereinafter "detection unit") receives input data for analysis. As described above, the input data can be in a variety of formats. For example, the input data can simply be a plaintext file containing the unformatted text of a textbook. The input data can also include formatting data to allow the detection unit to better understand the context of the information contained within the input data. After receiving the input data, control then flows to block 202.

At block 202, in some embodiments, the detection unit analyzes the structure of the input data for context. An initial analysis of the structure of the input data can provide information about the context of the information within the input data, possibly permitting a more efficient analysis of the input data itself. For example, during an analysis loop discussed below, the detection unit may look up information related to subject matter candidates. By analyzing the structure of the input data, the detection unit may be able to determine that the input data relates to chemistry, thus allowing the detection unit to exclude unrelated information from any information searches done in the analysis loop.

The structure of the input data can be analyzed as described above. For example, the detection unit can analyze text determined to be titles or section headers for words that describe the subject matter associated with that section. Even files lacking actual formatting information can include indications of structure. For example, plaintext files can still include tabs and carriage returns, allowing individual paragraphs to be distinguished. The detection unit may determine that individual paragraphs consisting of one sentence of less than ten words is a section header. The detection unit may also determine that certain contiguous paragraphs contain a specific term with high frequency, allowing the detection unit to further determine that the term identifies the main subject matter of that section of the input data. After analyzing the input data for structure, control then flows to block 204.

At block 204, the input data is apportioned into analysis data units. An analysis data unit can be as large as all of the input data (yielding one analysis data unit) or as small as an individual word. By apportioning the data into analysis data units, the detection unit can focus the analysis on the particular subject matter within the detection unit in light of the most relevant context. For example, a geography textbook may discuss both the state of Georgia, part of the United States of America, as well as the country of Georgia. An analysis data unit that includes both discussions may yield less relevant visualizations than an analysis data unit that separates the discussions. Similarly, an analysis data unit that is too small can yield less relevant visualizations than an analysis data unit that is larger due to lack of context. Various implementations can utilize different analysis data unit sizes, and can also be implemented to dynamically choose an analysis data unit size. The analysis data unit size can be determined based on the structure of the document as determined at block 202, as well as additional analysis of the input data. After the input data is apportioned into analysis data units, control then flows to block 206.

At block 206, the detection unit begins an analysis loop. The analysis loop is initialized by setting the current analysis data unit to the first apportioned analysis data unit. On subsequent iterations, the current analysis data unit is set to the next apportioned analysis data unit. Further operations may also be done depending on the specific implementation. For example, if the subject matter changes between two analysis data units or two sets of analysis data units, the detection unit may load different supplemental information or metadata for use during the analysis. After initializing or updating the analysis loop information, control then flows to block 208.

At block 208, the detection unit detects subject matter candidates within the analysis data unit. The detection unit can detect subject matter candidates by using techniques such as natural language processing, as described above. For example, the detection unit may determine that the grammatical subject of the first sentence of an analysis data unit is likely a visualizable subject matter. The detection unit indicates that the particular portion of the analysis data unit is a subject matter candidate. After detecting subject matter candidates, control then flows to block 210.

At block 210, in some embodiments, the detection unit analyzes the context associated with the subject matter candidates. For example, the detection unit can analyze the data in the analysis data unit to determine whether the data indicates any relationships between the subject matter candidates and other information. The detection unit can also use the structure of the input data, as determined at block 202, to analyze the context in which the subject matter candidate appears. The detection unit can be implemented to access data sources beyond the input data. For example, the detection unit can include a database of information. The detection unit can look up the subject matter candidate in the database to determine additional relationships or other context that is not available solely with the input data. After analyzing the context associated with the subject matter candidates, control then flows to block 212.

At block 212, the detection unit determines confidence levels for the detected subject matter candidates. For example, the detection unit can determine whether ambiguity about the meaning of a particular term exists. An analysis data unit might be a single paragraph that includes the phrase "the state of Georgia," but does not provide any details which, alone, indicate whether "Georgia" refers to the state or the country. Even though the word "state" is used, "state" can be used as a synonym to the word "country." Furthermore, the country of Georgia was once part of Russia and the Soviet Union, potentially making it a "state" of either country, in the same sense that Georgia is a state of the United States of America. The detection unit might determine, based on additional information, that eighty percent of the time the phrase "state of Georgia" is used in conjunction with the state in the United States of America. Thus, the detection unit might determine that the confidence level that the phrase refers to the state of Georgia in the United States of America is eighty percent, and the confidence level that the phrase refers to the country of Georgia is twenty percent. After determining the confidence levels for the detected subject matter candidates, control then flows to block 214.

At block 214, the detection unit determines whether the confidence levels for the subject matter candidates are greater than a confidence threshold. If the confidence level for a particular subject matter candidate is greater than the confidence threshold, the subject matter candidate is indicated to be an actual subject matter. If the confidence level for a particular subject matter candidate is less than or equal to the confidence threshold, the subject matter candidate remains a candidate or may be indicated as not being a subject matter candidate. If the confidence level is greater than the confidence threshold, control flows to block 216. If the confidence level is less than or equal to the confidence threshold, control flows to block 222.

At block 216, the detection unit includes an identification of the subject matter in the analysis results. The subject matter can be identified by specifying the location of the subject matter in the textbook, specifying the actual data that makes up the subject matter, etc. Additional data that can be used to select and/or configure the appropriate visualization engine or assist in placing the visualization can be included as well. For example, the detection unit may utilize the structure analysis of the input data at block 202 to determine a set of "tags" that are indicative of the subject matter associated with the subject matter. For a quadratic equation, the tags may include "mathematics," "algebra," "polynomials" and "quadratic equations." As discussed later, the detection unit can utilize these tags to select the appropriate visualization engine. After indicating the subject matter in the analysis results, control then flows to block 218.

If the check at block 214 determines that the confidence level is currently less than a confidence threshold, then control flows to block 222. At block 222, the detection unit determines whether the amount of additional data analyzed during prior analyses is above a specified threshold. As described below, if the confidence level of the analysis is below the confidence threshold, the detection unit may increase the amount of data analyzed in order to better establish the context of the subject matter candidate. However, it is possible that, at a certain point, increasing the amount of data analyzed does not help the analysis, thus the detection unit determines that the subject matter candidate is not an actual subject matter. The threshold can be predetermined, for example, by running tests during the development of the detection unit. The threshold can also be dynamically determined. For example, the detection unit may determine that the subject matter of the additional data is not related to the data being analyzed, thus providing no additional context useful to the analysis. The detection unit can also track the number of times additional data is added to a particular analysis and the confidence levels for the prior analyses. If, after a specified number of analyses, the confidence level has not increased beyond a certain amount, the detection unit may determine that adding additional data will not be useful. If it is determined that the amount of additional data analyzed is not above the threshold, control then flows to block 224. If it is determined that the amount of additional data analyzed is above the threshold, control then flows to block 218.

At block 224, the detection unit adds additional data to the analysis for additional context. For example, the detection unit determines that "Georgia" in the phrase "the state of Georgia" is a subject matter candidate, but is not confident which "Georgia" is being referred to (the country or the state in the United States of America). In this example, the analysis is initially limited to the structure analysis and the individual analysis data unit. However, the detection unit can expand the analysis to include, for example, contiguous analysis data units. Additional analysis data units can increase the amount of context surrounding the subject matter candidate, potentially allowing for a higher confidence level for the analysis. For example, the analysis data unit immediately prior to the current analysis data unit may refer to "the 1920's" and "Soviet Russia," thus indicating that the reference to "the state of Georgia" is not only referring to the country of Georgia, but specifically the Georgia Soviet Socialist Republic as it existed in the 1920's. After adding additional data to the analysis, control flows back to block 210.

Control flowed to block 218 if the detection unit determined that the amount of additional data analyzed was above a threshold at block 222. Control also flowed to block 218 from block 216. At block 218, the detection unit determines whether all analysis data units have been analyzed. If not all analysis data units have been analyzed, the loop continues and control flows back to block 206. If all analysis data units have been analyzed, control then flows to block 220.

At block 220, the analysis loop is complete. All analysis data units have been analyzed, and all subject matter found with a confidence greater than the confidence threshold is indicated. The completed analysis results are in a format that can be used to select the appropriate visualization engine. Thus, the process ends.

Figure 3:
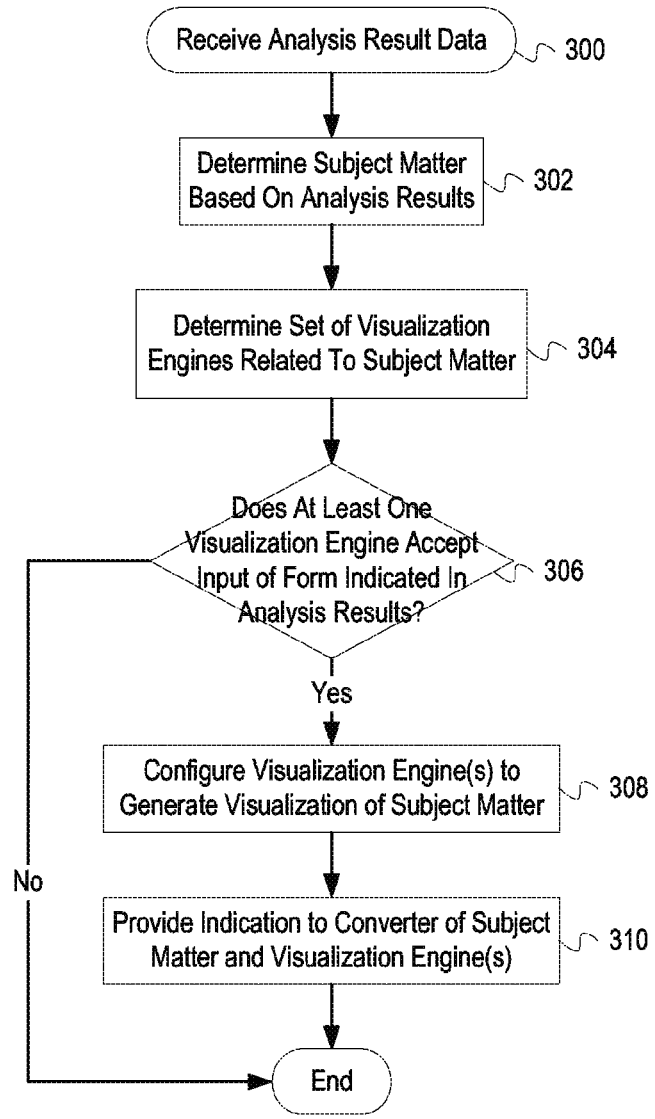
FIG. 3 depicts a flowchart of example operations for selecting a visualization engine for a particular subject matter.

FIG. 3 depicts a flowchart of example operations for selecting a visualization engine for a particular subject matter.

At block 300, the visualization engine selection unit (hereinafter "selection unit") receives the analysis results for a subject matter from a detection unit. The specific format of the analysis results can vary between implementations, as described above. Additionally, some functionality of the detection unit can be implemented in the selection unit, and vice versa, while some functionality may not be implemented at all or additional functionality implemented. Thus, depending on the location of specific functionality or whether certain functionality is implemented or not, the analysis results format may vary. For example, generating tags to describe the subject matter of a subject matter is discussed above. The tags can be generated by the detection unit and included in the analysis results, to be used by the selection unit. However, this functionality can also be implemented in the selection unit instead, resulting in the analysis results not including the tags. After receiving the analysis results for the subject matter, control then flows to block 302.

At block 302, the selection unit determines the subject matter based on the analysis results. In implementations where the analysis results includes a set of tags or other data indicating the subject matter of the subject matter, the selection unit can use the supplied data. In implementations where the selection unit determines the subject matter of the subject, the selection unit can analyze the supplied analysis results as described above for the detection unit. The selection unit can be implemented such that it can access the input data available to the detection unit, which can also be used to determine the subject matter. After determining the subject matter of the subject matter, control then flows to block 304.

At block 304, the selection unit determines a set of visualization engines related to the subject matter. For example, the analysis results for the visualization engine descriptions and related data can be stored in a database. The selection unit can query the database for visualization engines that are associated with tags similar to tags supplied in the analysis results or determined at block 304 for the subject matter. This can reduce the number of visualization engines being considered for the subject matter, potentially improving efficiency over comparing available input forms for all visualization engines available. After determining the set of visualization engines related to the subject matter, control then flows to block 306.

At block 306, the selection unit determines if at least one visualization engine accepts an input of the same form indicated in the analysis results. The input forms accepted by a particular visualization engine can be determined by comparing the analysis results from the analysis of the associated visualization engine description to the analysis results from the analysis of the subject matter. For example, the analysis results can include different variations of language, such as phrases, that the detection unit determined defined the subject matter. The selection unit can compare each variation of language from the analysis results of the visualization engine descriptions and the analysis results of the subject matter. The selection unit can then determine whether any of the variations of language are similar to each other using various techniques such as computing the Hamming or Levenshtein distance. The analysis of the visualization engine descriptions can also be implemented such that the analysis can determine specific examples of input formats included in the visualization engine descriptions. This can reduce instances where a phrase in the analysis results for the visualization engine description is similar to a phrase that defines the subject matter, but is not an input format. If it is determined that at least one visualization engine accepts an input of the same form as indicated in the analysis results, control then flows to block 308. If it is determined that no visualization engine accepts an input of the same form as depicted in the analysis results, the process ends.

At block 308, the selection unit configures the visualization engine(s) to generate visualization(s) of the subject matter. The techniques used to configure a visualization engine can vary based on the implementation. For example, the selection unit may make an API call to the visualization unit's API or may write a file in a format that is readable by the visualization engine. In some implementations, the selection unit can also configure user interface elements of the visualization engine as well. For example, the selection unit can be implemented to specify the units each axis, a background image or colors for a graphing visualization engine. Generating a visualization also applies to subject matter identified as part of an existing visualization, as discussed above. Additionally, generating a visualization includes selecting an existing image, such as an existing picture of Mount Vernon. After the visualization engine(s) is/are configured to generate visualization(s) of the subject matter, control then flows to block 310.

At block 310, the selection unit provides indications of the subject matter and visualization engines to the converter. The indications of the subject matter and visualization engines can vary between implementations. For example, the subject matter may be the actual text defining the subject matter or a specification of the location of the subject matter within the source text. The indications of the visualization engine may be a link to a resource that represents the visualization engine or a visualization engine identifier and configuration information for the visualization engine. The techniques in which the indications are provided to the converter can also vary between implementations. For example, the selection unit may be implemented as an integral part of the converter, and thus may call a function and pass data representing the indications as a parameter of the function. The selection unit may call a function defined by an API associated with the converter or write to a specific file that is subsequently read by the converter. After providing the indications of the subject matter and visualization engines to the converter, the process ends.

Figure 4:
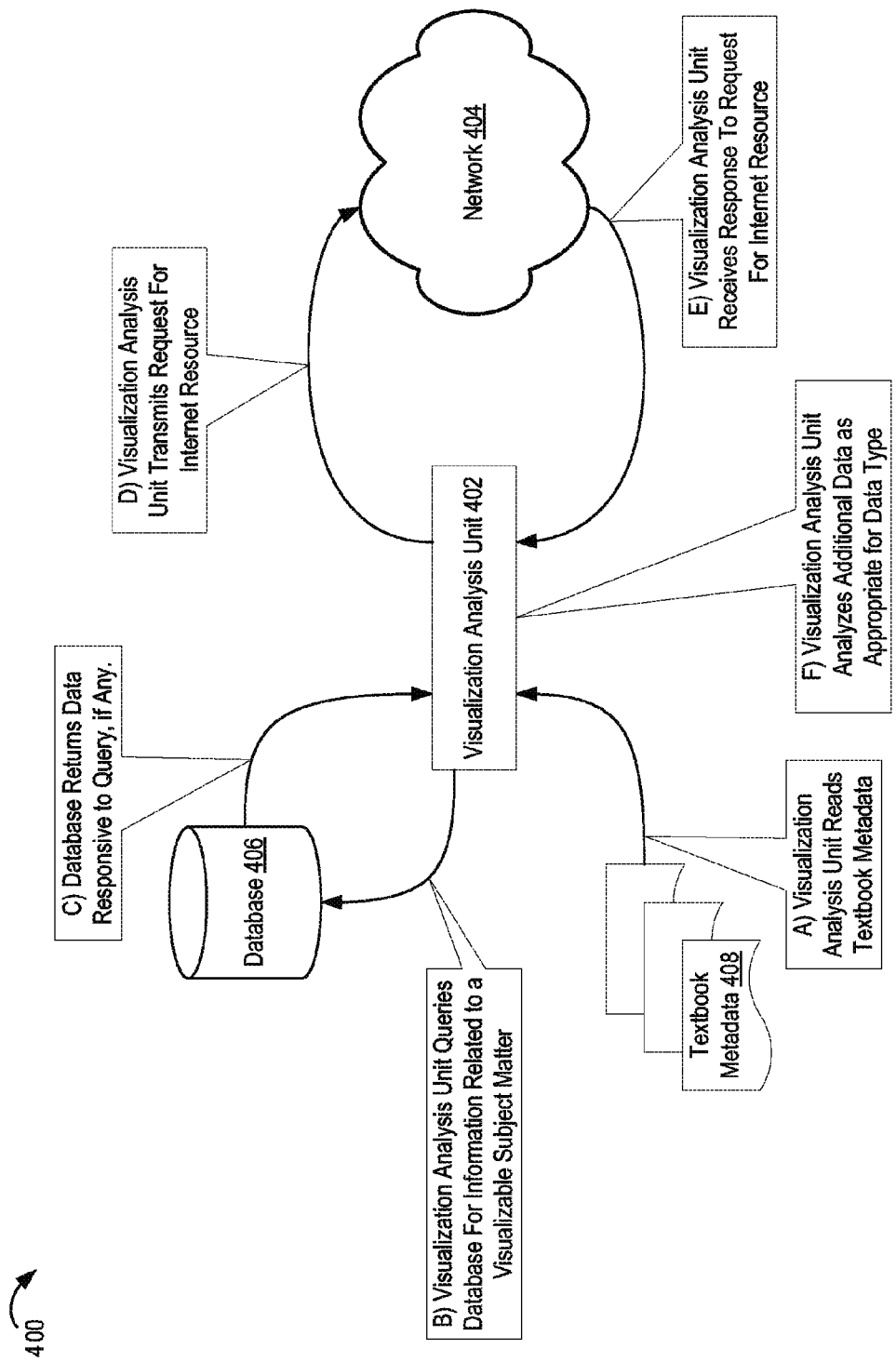
FIG. 4 depicts further details on the interactions of a visualization analysis unit with various data sources.

FIG. 4 depicts further details on the interactions of a visualization analysis unit with various data sources. FIG. 4 depicts a subset of a visualizing textbook digitization system 400, including a visualization analysis unit (hereinafter analysis unit) 402. The visualizing textbook digitization system 400 also includes three data sources: textbook metadata 408, a database 406 and the network 404. The analysis unit 402 can be the same as the analysis unit 107 (FIG. 1).

As described in reference to FIGS. 1 and 2, the visualization analysis unit 402 can analyze data external to the textbook being digitized in order to improve the context surrounding subject matter detected in the textbook. The text accompanying FIGS. 1 and 2 describe examples of textbook metadata and a database. Both are described below, as well as interactions with the Internet 404.

At stage A, the analysis unit 402 reads the textbook metadata 408. The textbook metadata 408 can be stored in a location accessible to the analysis unit 402, or provided as input with the textbook data. The textbook metadata 408 can also be stored in a database, on a network or in another location that can store data and be accessed directly or indirectly by the analysis unit 402. The textbook metadata 408 can include a variety of data about the textbook being digitized. For example, the textbook metadata 408 can include the Library of Congress Classification number associated with the book, the subject matter of the textbook, a synopsis of the textbook, biographical details about the textbook authors, etc. The textbook metadata 408 can vary between implementations, and can be implemented to include metadata specifically designed to assist the analysis unit 402 in determining the context of subject matter within the textbook. For example, the textbook metadata 408 can include a representation of the textbook structure, similar to what is determined by the analysis unit in block 202 of FIG. 2. By providing the structure to the analysis unit 402, incorrect analyses of the structure can be reduced, providing more accurate analysis results. "Tags" can also be included with the textbook metadata 408. Tags can be single words or short phrases that highlight specific subject matter found within the textbook, similar to the tags described above.

At stage B, the analysis unit 402 queries the database 406 for information related to a subject matter. The type and contents of the database 406 query can vary between implementations. For example, some databases may include data about particular subject matter. Thus, when the analysis unit 402 detects a subject matter candidate, the analysis unit 402 can query the database 406 to determine if there is additional information stored in the database 406 associated with the subject matter candidate. If the query fails because there is no matching entry in the database 406, the analysis unit 402 can update the confidence level of the analysis accordingly. Similarly, if the query is successful, the analysis unit 402 can update the confidence level of the analysis accordingly. If the query returns data, the analysis unit 402 can analyze the data to verify it fits the context in the textbook prior to accepting that the information is actually relevant to the subject matter candidate. The database 406 can look for exact matches to the query or look for matches that are similar, but not exact (commonly referred to as fuzzy matching).

At stage C, the database 406 returns data responsive to the query if any was found. The types of data that can be returned can vary between implementations. For example, the data returned can be text that the analysis unit 402 can analyze similar to the text of the textbook. The text may have been inserted into the database 406 specifically because it provides a good source of context for the associated subject matter. The data returned could be tags similar to that described above. The analysis unit 402 can then use the tags in the analysis by looking for the tags or other words/phrases associated with the tags in the text being analyzed.

Additionally, if the query matches (or is a near match for) multiple database 406 entries, each entry can be returned. For example, if the analysis unit 402 queries the subject matter of "Georgia," the database 406 may return data associated with both the state of Georgia and the country. The data returned can be text associated with each, as described above. The analysis unit 402 can analyze the data associated with each and determine which is closest to the context in which the subject matter is used in the textbook. The resultant data can also be specific terms that distinguish the two subject matters from each other. For example, the entry for the state of Georgia might include the terms "Atlanta" and "United States," while the entry for the country of Georgia might include the terms "Tbilisi" and "Caucasus." The analysis unit 402 could analyze the textbook text, looking for the terms included in the data returned from the database 406 in order to determine which subject matter is correct.

At stage D, the analysis unit 402 transmits a request for a network 404 resource. The request can take a variety of forms, and the specific network 404 resource requested can vary as well. For example, the request can be an API call to an Internet-based search engine. The analysis unit 402 can provide the subject matter to the search engine in order to locate additional information and data related to the subject matter, potentially providing greater context for the subject matter. The request can be for a specific page located on the network 404 as well. For example, a textbook can provide a list of citations at the end of a chapter, embedded in the text using footnotes, etc. Some of the citations may include uniform resource locator (URL) addresses. The analysis unit 402 can send a request to the network 404 for the URL associated with the citation.

At stage E, the analysis unit 402 receives the response to the request for the Internet 404 resource. The response will vary with the type of resource being requested. For example, a URL can point to a webpage in a hypertext markup language (HTML) format, a binary media file such as an image or audio file, or a plaintext file. An API call can return data in various formats as well, including HTML, extensible markup language (XML), and JavaScript® Object Notation (JSON) formats.

At stage F, the analysis unit 402 analyzes the additional data from the various data sources. The manner in which the analysis unit 402 utilizes the data can vary depending on the data type. For example, the use of different types of results from a database query is described above. However, the additional data is generally utilized to provide greater context to the particular subject matter candidate. For example, a request transmitted to a location within the network 404 may return a list of documents related to the subject matter candidate. The analysis unit 402 can then download the individual documents. The analysis unit 402 might analyze the documents looking for distinct words, phrases or relationships that distinguish ambiguous subject matter. For example, a history book may refer to a geographical location named "Georgia." The analysis unit 402 may recognize that the reference is ambiguous, as described above. After downloading documents related to "history" and "Georgia," the analysis unit 402 may determine that references to the history of the country of Georgia typically occur with the terms "Soviet" or "Russia." On the other hand, the analysis unit 402 may determine that references to the history of the state of Georgia typically occur with the terms "United States" or "Civil War." Thus, after making these determinations, the analysis unit 402 can analyze the textbook by looking for those terms. If the analysis unit 402 finds references to "Russia," the confidence level that the subject matter is the country of Georgia may increase accordingly.

Although FIG. 4 depicts textbook metadata 408, a database 406 and the network 404, any data source can be utilized. For example, the analysis unit 402 can send requests to any network, such as a local area network, intranet or the Internet. A data source can include a collection of files located on a hard disk, etc. In fact, the data does not have to be textual data, but can be any type of data. The data itself does not have to be analyzed either. For example, if a search, whether on a network, database, file system or other searchable medium, for a particular subject matter candidate returns a large number of audio files, the analysis unit 402 might determine that the subject matter is a band or other musically related subject matter. However, the analysis unit 402 can also be implemented to analyze the non-textual data. For example, if a search, whether on a network, database, file system or other searchable medium returns image files, the analysis unit 402 might use facial recognition to determine if the image files are pictures of the same person. The analysis unit 402 can then determine that the subject matter candidate is a particular person that appears in the image files.

As described above, while textbook digitization is an example of an area in which the inventive subject matter is applicable, it is not so limited. The inventive subject matter is applicable in any scenario where subject matter is detectable based on the context in which they appear. Another example is a conversation between two or more participants, as described below.

Figure 5:
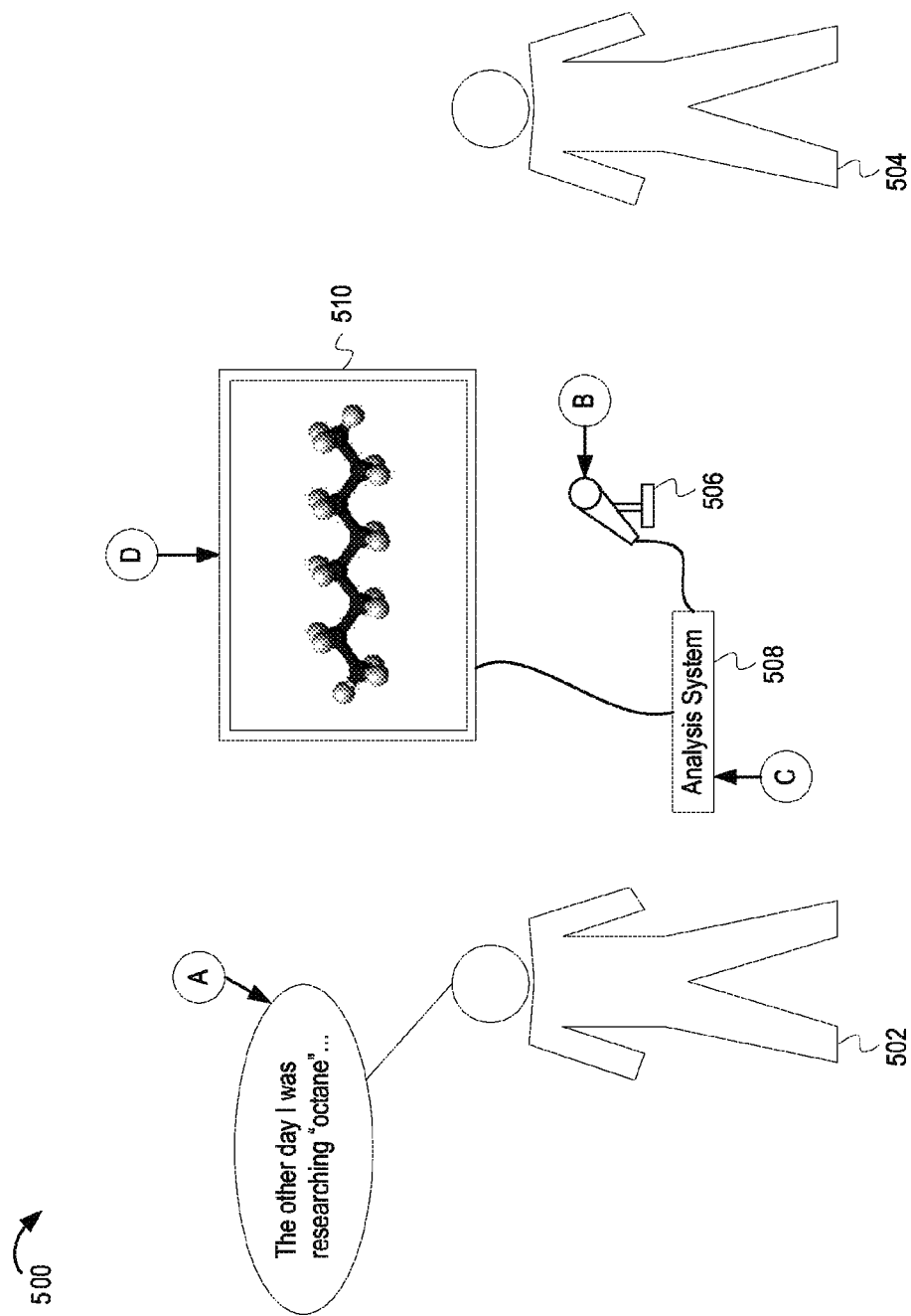
FIG. 5 depicts the interactions of a visualization analysis unit implemented to analyze spoken conversation and display visualizations dynamically on a display.

FIG. 5 depicts the interactions of a visualization analysis unit implemented to analyze spoken conversation and display visualizations dynamically on a display. FIG. 5 depicts a visualizing communication analysis system 500 and two conversation participants 502 and 504. The visualizing communication analysis system 500 includes a microphone 506, an analysis system 508 and a display 510.

At stage A, the first conversation participant 502 begins a conversation with the second conversation participant 504. The conversation can be about any particular topic that includes at least one visualizable subject matter. In this particular example, the first conversation participant 502 states: "The other day I was researching 'octane' . . . " "Octane" is a chemical compound, and thus can be visualized as a molecule.

At stage B, the microphone 506 converts the conversation into an electrical signal. The microphone 506 is connected to the analysis system 508 in a manner that allows the microphone to transmit the electrical signal to the analysis system 508. The microphone 506 can convert the conversation into an analog electric signal and then transmit the signal to the analysis system 508, or the microphone 506 can further convert the analog electrical signal into a digital signal before transmitting it to the analysis system 508. The microphone 506 can transmit the converted conversation to the analysis system 508 over a wire or using a wireless connection. Stage B can occur in parallel to stage A, and occurs as long as the microphone 506 is recording.

At stage C, the analysis system 508 analyzes the transmitted conversation for subject matter. The analysis can be similar to the analysis described above for textbook digitization. However, the analysis system 508 can also employ a speech-to-text converter to convert the transmitted conversation into a text transcript. The resulting transcript can be input into the analysis system 508 similar to a scanned textbook after undergoing OCR processing. Thus, the analysis system 508 can be substantially similar to that of the above described systems. However, the analysis system 508 can also vary, and may be implemented in a manner that provides better results for the particular scenarios encountered. For example, a spoken conversation may provide less context, while also being facilitated by a fast response time from the analysis system 508. The analysis system 508 can facilitate a fast response time by lowering the confidence threshold, thus using less additional data to increase the confidence in a particular subject matter candidate. Further, instead of simply displaying a visualization for the subject matter candidate with the highest confidence, the analysis system 508 can provide an interface that allows the conversation participants 502 and 504 to select from a list of possible subject matter or visualizations.

At stage D, the analysis system 508 displays the visualization on the display 510 connected to the analysis system 508. Similar to the microphone 506, the analysis system 508 can be connected to the display 510 in a variety of ways, including wired and wireless connections. The analysis system 508 can also be implemented to allow interactions with the visualization. For example, the analysis system 508 can include a variety of input devices, such as keyboards and mice. The display 510 can be a touchscreen display, allowing the conversation participants 502 and 504 to interact with the visualization by touching the screen. As the conversation between the conversation participants 502 and 504 continues, additional subject matter may be detected, and an appropriate visualization displayed.

As described above, the analysis system 508 can function similarly to the analysis systems described in the textbook digitization examples. For example, the analysis of a text transcript of the conversation is similar to the analysis of the analysis data units. The analysis system 508 can also utilize other data sources as depicted in FIG. 4. Instead of providing the selected visualization engine to a scanner/converter, the analysis system 508 provides the selected visualization engine to the display 510.

The microphone 506, analysis system 508 and display 510 can be combined in various ways. For example, a cellphone includes a microphone and display. Thus, a cellphone can also include an analysis system, permitting the cellphone to combine all three components. An analysis system 508 can be a part of a computer system with a built-in microphone that is connected to the external display 510.

As the textbook digitization and dynamic detection of subject matter in spoken conversation example indicate, the inventive subject matter is applicable in a variety of scenarios. Dynamically adding visualizations to webpages as a user surfs the Internet is a scenario similar to that of textbook digitization in which the inventive subject matter is applicable. An analysis system could also be implemented to track where a user is looking, detect whether the user is looking at text, analyze the text for subject matter and display the visualizations on a pair of glasses being worn by the user or on a display. The text could be on an electronic display like a computer screen, in a magazine, etc.

As example flowcharts, the flowcharts depicted above present operations in an example order from which embodiments can deviate (e.g., operations can be performed in a different order than illustrated and/or in parallel). For example, instead of analyzing individual analysis data units at once, as depicted in FIG. 2, individual analysis data units could be analyzed in parallel.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
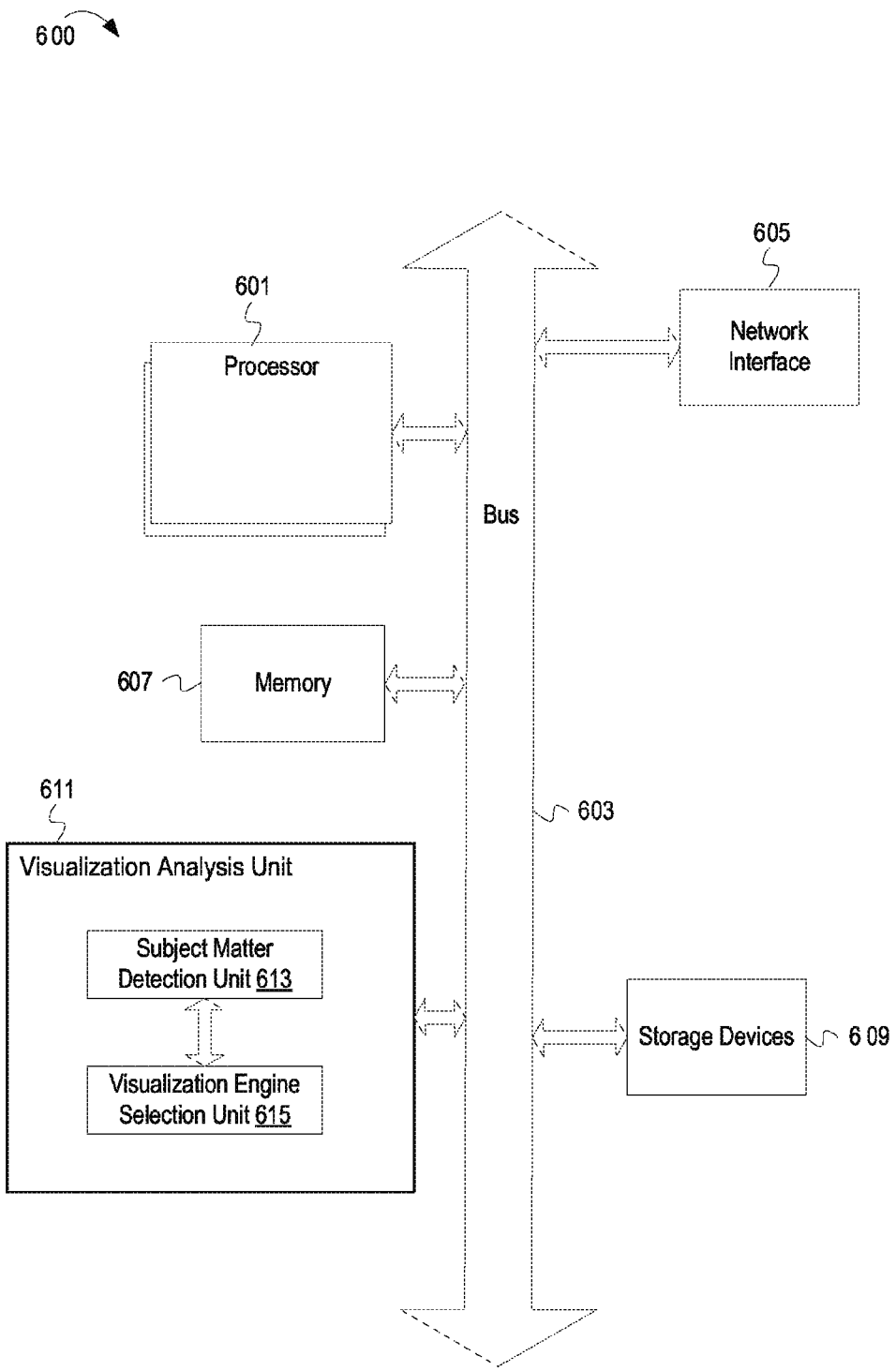
FIG. 6 depicts an example computer system including a visualization analysis unit.

FIG. 6 depicts an example computer system including a visualization analysis unit. A computer system includes a processor unit 601 (possibly including multiple processors, multiple cores, multiple nodes, and/or implementing multithreading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, Hyper-Transport®, InfiniBand®, NuBus, etc.), a network interface 605 (e.g., an ATM interface, an Ethernet interface, a Frame Relay interface, SONET interface, wireless interface, etc.), and a storage device(s) 609 (e.g., optical storage, magnetic storage, etc.). The computer system also includes a visualization analysis unit 611, which includes a subject detection unit 613 and a visualization engine selection unit 615. The visualization analysis unit 611 embodies functionality to implement embodiments described above. The visualization analysis unit 611 may include one or more functionalities that facilitate the detection of visualizable subject matter appearing in various types of communications and the selection of appropriate visualization engines with which to produce visualizations of the visualizable subject matter. The subject matter detection unit 613 may include one or more functionalities that facilitate the analysis of input data in order to detect subject matter based on the contexts in which the subject matter appears. The visualization engine selection unit 615 may include one or more functionalities that facilitate the selection of a visualization engine that is appropriate for a detected subject matter based on the analysis of the subject matter detection unit 613. Any one of these functionalities may be partially (or entirely) implemented in hardware and/or on the processing unit 601. For example, the functionality may be implemented with an application specific integrated circuit, in logic implemented in the processing unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601, the storage device(s) 609, and the network interface 605 are coupled to the bus 603. Although illustrated as being coupled to the bus 603, the memory 607 may be coupled to the processor unit 601.

While the embodiments are described with reference to various implementations and exploitations, it will be understood that these embodiments are illustrative and that the scope of the inventive subject matter is not limited to them. In general, techniques context-based visualization generation as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A method comprising:
    dividing first data into data units, wherein the first data is from a first data source;
    analyzing contextual information within a first of the data units;
    detecting a visualizable subject matter contained within the first of the data units based, at least in part, on said analysis of the contextual information within the first of the data units, the visualizable subject matter including a detected subject, and a detected input parameter, wherein the visualizable subject matter comprises mathematics;
    analyzing second data associated with each of a plurality of visualization engines, wherein each of the plurality of visualization engines is configured to receive an input and generate an interactive visualization based, at least in part, on the input, wherein the second data includes an engine subject matter and an engine input parameter form related to a visualization engine of the plurality of visualization engines;
    selecting a first of the plurality of visualization engines based, at least in part, on a relevance of the first of the plurality of visualization engines to the visualizable subject matter, wherein the relevance is based, at least in part, on the detected subject matter, the engine subject matter, and whether the detected input parameter is in a form acceptable to the first of the plurality of visualization engines based on the engine input parameter form; and
    providing the visualizable subject matter as the input to the first of the plurality of visualization engines, wherein the first of the plurality of visualization engines generates a graph of an equation based, at least in part, on the detected input parameter.

2. The method of claim 1, wherein said analyzing the contextual information within the first of the data units comprises:
    analyzing at least one of text data within the first of the data units, metadata within the first of the data units, or graphical data within the first of the data units.

3. The method of claim 1, further comprising:
    obtaining additional contextual information from a second data source distinct from the first data source; and
    analyzing the additional contextual information;
    wherein said selecting the first of the plurality of visualization engines is further based, at least in part, on said analysis of the additional contextual information.

4. The method of claim 1, wherein said analyzing the contextual information comprises:
    using a language processor to analyze data representing at least one of speech or text.

5. The method of claim 4 further comprising:
    selecting the language processor from a plurality of language processors, wherein the language processor is selected based on the contextual information.

6. The method of claim 1 further comprising:
    generating the interactive visualization of the visualizable subject matter; and
    displaying the interactive visualization of the visualizable subject matter.

7. The method of claim 1, wherein said detecting the visualizable subject matter contained within the first of the data units comprises detecting the visualizable subject matter in graphical data, and further comprising replacing the graphical data with an interactive graph or model.

8. The method of claim 1 further comprising:
determining a confidence level based, at least in part, on said analysis of the contextual information within the first of the data units;
determining that the confidence level is below a confidence threshold; and
in response to said determining that the confidence level is below the confidence threshold, analyzing contextual information within a second of the data units;
wherein said detecting the visualizable subject matter contained within the first of the data units is further based, at least in part, on said analysis of the contextual information within the second of the data units.

9. The method of claim 1 further comprising:
detecting a potential visualizable subject matter within the first of the data units;
retrieving, from a second data source, a first supplemental data unit; and
analyzing contextual information within the first supplemental data unit;
wherein said detecting the visualizable subject matter contained within the first of the data units is further based, at least in part, on said analysis of the contextual information within the first supplemental data unit.

10. The method of claim 1, further comprising transforming the visualizable subject matter into a format appropriate for input parameters to the first of the plurality of visualization engines.

11. A computer program product comprising:
a computer readable memory storage device having computer usable program code embodied therewith, the computer usable program code comprising computer usable program code to:
divide first data into data units, wherein the first data is from a first data source;
analyze contextual information within a first of the data units;
detect a visualizable subject matter contained within graphical data of the first of the data units based, at least in part, on said analysis of the contextual information within the first of the data units, the visualizable subject matter including a detected subject, and a detected input parameter;
analyze second data associated with each of a plurality of visualization engines, wherein each of the plurality of visualization engines is configured to receive an input and generate an interactive visualization based, at least in part, on the input, wherein the second data includes an engine subject matter and an engine input parameter form related to a visualization engine of the plurality of visualization engines;
select the first of the plurality of visualization engines based, at least in part, on a relevance of the first of the plurality of visualization engines to the visualizable subject matter, wherein the relevance is based, at least in part, on the detected subject matter, the engine subject matter, and whether the detected input parameter is in a form acceptable to the first of the plurality of visualization engines based on the engine input parameter form; and
provide the visualizable subject matter as the input to the first of the plurality of visualization engines, wherein the first of the plurality of visualization engines replaces the graphical data with an interactive graph or three dimensional model.

12. The computer program product of claim 11, wherein the computer usable program code to analyze the contextual information within the first of the data units comprises computer usable program code to:
analyze at least one of text data within the first of the data units, metadata within the first of the data units, or graphical data within the first of the data units.

13. The computer program product of claim 12, wherein the computer usable program code further comprises computer usable program code to:
obtain additional contextual information from a second data source distinct from the first data source; and
analyzing the additional contextual information;
wherein said selection of the first of the plurality of visualization engines is further based, at least in part, on said analysis of the additional contextual information.

14. The computer program product of claim 11, wherein the computer usable program code further comprises computer usable program code to:
determine a confidence level based, at least in part, on said analysis of the contextual information within the first of the data units;
determine that the confidence level is below a confidence threshold; and
in response to a determination that the confidence level is below the confidence threshold, analyze contextual information within a second of the data units;
wherein detection of the visualizable subject matter contained within the first of the data units is further based, at least in part, on said analysis of the contextual information within the second of the data units.

15. An apparatus comprising:
a processor; and
a machine readable storage medium having program code stored therein that is executable by the processor to cause the apparatus to,
divide first data into data units, wherein the first data is from a first data source;
analyze contextual information within a first of the data units;
detect a visualizable subject matter contained within graphical data of the first of the data units based, at least in part, on said analysis of the contextual information within the first of the data units, the visualizable subject matter including a detected subject, and a detected input parameter;
analyze second data associated with each of a plurality of visualization engines, wherein each of the plurality of visualization engines is configured to receive an input and generate an interactive visualization based, at least in part, on the input, wherein the second data includes an engine subject matter and an engine input parameter form related to a visualization engine of the plurality of visualization engines;
select a first of the plurality of visualization engines based, at least in part, on a relevance of the first of the plurality of visualization engines to the visualizable subject matter, wherein the relevance is based, at least in part, on the detected subject matter, the engine subject matter, and whether the detected input parameter is in a form acceptable to the first of the plurality of visualization engines based on the engine input parameter form; and
provide the visualizable subject matter as the input to the first of the plurality of visualization engines, wherein the first of the plurality of visualization engines replaces the graphical data with an interactive graph or three dimensional model.

16. The apparatus of claim 15, wherein the program code to analyze the contextual information within the first of the data units comprises program code to:
  analyze at least one of text data within the first of the data units, metadata within the first of the data units, or graphical data within the first of the data units.

17. The apparatus of claim 16, wherein the program code further comprises program code to:
  obtain additional contextual information from a second data source distinct from the first data source; and
  analyzing the additional contextual information;
  wherein said selection of the first of the plurality of visualization engines is further based, at least in part, on said analysis of the additional contextual information.

18. The apparatus of claim 15, wherein the program code further comprises program code to:
  determine a confidence level based, at least in part, on said analysis of the contextual information within the first of the data units;
  determine that the confidence level is below a confidence threshold; and
  in response to a determination that the confidence level is below the confidence threshold, analyze contextual information within a second of the data units;
  wherein detection the visualizable subject matter contained within the first of the data units is further based, at least in part, on said analysis of the contextual information within the second of the data units.

* * * * *